United States Patent
Eberle

(10) Patent No.: US 7,431,142 B2
(45) Date of Patent: Oct. 7, 2008

(54) CONVEYOR SYSTEM WITH CONVEYOR ELEMENTS RUNNING ALONG A GUIDE-WAY ON ROLLERS AND METHOD FOR THE MANUFACTURING OF THE ROLLERS

(75) Inventor: Jürg Eberle, Hinwil (CH)

(73) Assignee: Ferag AG, Hinwil (CH)

( * ) Notice: Subject to any disclaimer, the term of this patent is extended or adjusted under 35 U.S.C. 154(b) by 0 days.

(21) Appl. No.: 11/357,475

(22) Filed: Feb. 17, 2006

(65) Prior Publication Data
US 2006/0185966 A1 Aug. 24, 2006

(30) Foreign Application Priority Data
Feb. 21, 2005 (CH) ................................ 0295/05

(51) Int. Cl.
*B65G 17/18* (2006.01)
(52) U.S. Cl. ................................ 198/465.4; 198/838
(58) Field of Classification Search .............. 198/465.4, 198/838
See application file for complete search history.

(56) References Cited

U.S. PATENT DOCUMENTS

| 4,312,444 | A | | 1/1982 | Mushovic | |
|---|---|---|---|---|---|
| 4,567,088 | A | | 1/1986 | Skogman et al. | |
| 4,640,196 | A | * | 2/1987 | Dehne | 104/94 |
| 6,105,757 | A | * | 8/2000 | Ledingham | 198/836.3 |
| 6,321,895 | B1 | * | 11/2001 | Kilby et al. | 198/852 |
| 6,382,397 | B2 | * | 5/2002 | Maeder | 198/465.4 |
| 6,554,127 | B1 | * | 4/2003 | Kroll | 198/465.4 |
| 6,745,891 | B2 | * | 6/2004 | Walter et al. | 198/465.4 |
| 6,758,325 | B2 | * | 7/2004 | Greeley | 198/687.1 |
| 2003/0029701 | A1 | * | 2/2003 | Sykora | 198/853 |
| 2003/0201153 | A1 | * | 10/2003 | Taeger | 198/687.1 |

FOREIGN PATENT DOCUMENTS

| DE | 24 04 651 | | 8/1975 |
|---|---|---|---|
| DE | 93 19 307.6 | | 2/1994 |
| DE | 44 06 620 | | 9/1995 |
| EP | 1 262 301 | | 12/2002 |
| GB | 1 205 097 | | 9/1970 |
| GB | 1205097 | A * | 9/1970 |

OTHER PUBLICATIONS

Derwent abstract of German Document No. DE2404651A.*

* cited by examiner

*Primary Examiner*—Mark A Deuble
(74) *Attorney, Agent, or Firm*—Rankin, Hill & Clark LLP

(57) ABSTRACT

A conveyor system including a guide-way (2) with guide rails (4) and conveyor elements (1) with rollers (3), wherein the rollers (3) are assigned to guide rails (4) located opposite one another and/or conveyor elements (1) include rollers (3) with non-parallel axes and due to this the system can be loaded with forces oriented in the most differing directions. The rollers (3) in this conveyor system comprise a relatively hard running jacket (5) with a running surface, which is flat transverse to the conveying direction. The material of the running jacket is paired with the material of the guide rail for low friction and little wear. In addition, the rollers (3) include a relatively soft, elastically deformable damper ring (6) arranged between the running jacket (5) and the roller body (7) and the guide rails (4) of the guide-way (2) are supported on a dampening substrate at least at such points of the conveying track, at which load changes occur.

8 Claims, 2 Drawing Sheets

CONVEYOR SYSTEM WITH CONVEYOR ELEMENTS RUNNING ALONG A GUIDE-WAY ON ROLLERS AND METHOD FOR THE MANUFACTURING OF THE ROLLERS

BACKGROUND OF THE INVENTION

Field of the Invention

The invention is situated in the field of materials handling technology and is related to a conveyor system including a guide-way, which defines a conveying track, as well as conveyor elements, which are moved along the guide-way with the aid of a suitable drive in a rolling manner. The invention is further related to a method for the manufacturing of the rollers for the conveyor system according to the invention.

For being loadable in a great number of different directions, each conveyor element of the conveyor system comprises a plurality of rollers, wherein a pair of opposing guide rails is assigned to each roller and/or the rollers have non-parallel axes. The guide-way of the conveyor system according to the invention is in particular a guide channel, in which the conveyor elements roll. It is also possible, however, that the guide way is designed in the shape of a girder to be encompassed by the conveyor elements, wherein rollers are rolling on several sides of the guide-way. The conveyor elements of the conveyor system are in particular joined together to form a conveyor chain and they are driven by chain wheels. However, it is possible also, to design the conveying elements to be essentially independent of one another and to be driven to push one another or to be individually coupled to corresponding drives.

Known conveyor systems with conveyor elements rolling on rollers in a guide channel and with conveyor elements connected together to a conveyor chain find application for conveying piece goods between processing stations, in particular for conveying large numbers of printed products, such as newspapers, magazines and brochures within the area of a dispatch room, where the printed products coming from the printing press, for example, are assembled, stapled, bound, addressed, cut, stacked, packaged and made ready for dispatch. In these conveyor systems the conveying elements usually are equipped with grippers, which protrude from the guide channel. Control means are provided for closing the grippers in order to grip an article at a loading point and for opening it at an unloading point in order to release the article.

Depending on the design of conveyor elements and guide-way, conveyor systems, as mentioned, make it easily possible to implement conveying tracks with bends, gradients and also with twists selectable within broad limits. This means that these systems are, in particular, suitable for the implementation of three-dimensional conveyor track arrangements in which the conveyed load, at different points of the conveying track, load the conveyor elements and the guide-way in different directions and in which load changes take place very frequently and rapidly after one another. Similar load changes may also occur in conveying track bends and in the case of changes between pushing and pulling operation. In order to master these load changes without problems, the conveyor elements are equipped with rollers whose axes have differing directions and/or for the same rollers two guide rails opposite one another are provided, as already mentioned above. Depending on the load condition, the load is coupled into the guide-way through one or the other guide roller and/or through one or the other guide rail.

For various reasons the conveyor elements of the conveyor systems, as mentioned, run along the guide-way with play, so that in case of load changes relatively high accelerations transverse to the conveying direction occur, which may possibly lead to shock-like contacts between the rollers and the guide-way and to sliding transverse movements of the rollers on the guide rails. Furthermore, rollers, to which two guide rails are assigned have to roll in different directions depending on the direction of the load, i.e. depending on which one of the guide rails they are running on even if the conveying direction remains unchanged. This means that for load changes, their rotation has to be stopped and accelerated in the opposite direction, which may lead to high frictional forces between rollers and guide rails. It is also possible, that in bends, conveyor elements are not conveyed being aligned exactly parallel to the conveying direction and that as a result of this they are in contact with both guide rails assigned to them and therefore perforce slide on them, which once again leads to high friction between roller and guide rail.

The friction and shock forces resulting from the mentioned changes of conditions are not only the cause of wear on the rollers and guide rails and of noise, they also have a negative effect on the drive power to be provided for conveying, wherein all mentioned effects become more serious with increasing conveying speeds and increasing frequencies of load changes along the conveying track.

The mentioned problems are countered in accordance with prior art, in that the rollers are equipped with a running jacket, which by means of a corresponding material and a corresponding shape is capable to dampen shocks through deformation. However, the selection of the running jacket material remains strongly limited due to the requirement regarding wear, which is to be as low as possible.

Known rollers, which are operating in conveyor systems of the type mentioned, therefore comprise a roller body and a running jacket. The roller body is supported on a shaft by means of a ball-bearing or is mounted fixedly on a correspondingly supported shaft and it is therefore capable to freely rotate around an axis. The running jacket extends around the circumference of the roller body, consists of a thermo-plastic material with a module of elasticity of usually approx. 400 to 1600 MPa, and has a running surface which, transverse to the conveying direction, has a convex form. The guide rails assigned to the roller are flat transverse to the conveying direction. The running jacket is usually manufactured by an injection molding process and is snapped onto the roller body so as to be under tension when mounted, such that the frictional locking produced by this tension prevents relative rotation between the running jacket and the roller body.

From the above comments it becomes apparent, that the running jacket material has to fulfil very many conditions, and it also follows, that it is unlikely that any selection of the running jacket material can fulfil all or a large part of the conditions to an optimum degree. In most cases this selection will constitute a suitable compromise. Further problems of known rollers result on the one hand from the softness of the roller jacket material and from the molding burr. The injection-moldable running jacket material's softness and its ability to creep make the rollers become non-circular and therefore run unevenly after a standstill under load. Because of the convex running surface the mold in which the running jacket is molded has to be separated where the diameter of the jacket is largest. Therefore, the molding burr extends in the middle of the running surface and, for impeccable operation would actually be removed which, however, represents additional manufacturing effort and expense and which therefore usually is not done.

BRIEF SUMMARY OF THE INVENTION

It is the objective of the invention to create a conveyor system of the type mentioned above, i.e. a conveyor system with a guide-way and conveyor elements being movable along the guide-way rolling on rollers, wherein the conveyor system in comparison with known conveyor systems of the same kind is to run more quietly and nonetheless is to produce less wear caused by friction, is to require less drive power for the same conveying capacity, and in addition is to provide simplifications in the manufacturing technology. Furthermore, it is an object of the invention to create a method for the manufacturing of rollers for the conveyor system according to the invention.

The improvement, in accordance with the invention, acts on the rollers and on the guide rails of the conveyor system and is based on a separation of the shock-absorbing function from the running surface function. Through this separation, the running surfaces of the rollers and of the guide rails can be designed to be flat in the direction transverse to the conveying direction and they can be made of a relatively hard, abrasion-resistant material with a small friction coefficient. The shock-absorbing function is taken over by the roller, and, at least at conveying track points, at which load changes occur, also by the guide rails, or more precisely by a damper ring provided between the running jacket and the roller body and by dampening substrates (damper rails), on which the guide rails are supported. Damper rings and damper rails consist of a relatively soft, elastically deformable material. Points of the conveying track, at which load changes occur, are in particular bends with a changing bending radius, twists, points, at which conveyor elements are loaded or unloaded, or points, at which conveyor elements are accelerated or braked.

The running jacket material and the guide rail material are matched together to provide low friction and little abrasion. They each respectively have a module of elasticity of more than 3000 MPa. The material of the damper ring and of the dampening substrate is designed to provide a good dampening by elastic deformation and it has a hardness in the range of between approx 35 to 98 (Shore A), advantageously between 50 and 80.

The running jacket material, for example, is a plastic material (e.g., polyamide), the material of the guide rail is a metal or a plastic material like the running jacket material. The material of the damper ring and dampening substrate is also a plastic material, for example, an elastomer.

The roller body consists, in a known manner, for example, of a metal or of a correspondingly hard plastic material with a module of elasticity in the range of at least 7000 MPa. The running jacket and the damper ring are advantageously positioned on the roller body free of tension and are capable of being secured against rotational movements relative to one another by means of a material fit or positive fit.

For manufacturing the rollers with the damper ring, the running jacket and the roller body are prefabricated. Thereupon the roller body and the running jacket are coaxially positioned in an injection molding mold and the damper ring is molded between them. Because the running jacket comprises a flat running surface, it is possible, for example to manufacture it out of a pipe-shaped work-piece by turning off on a lathe. Since the running ring and the roller body are utilised as casting mold parts for the manufacturing of the damper ring, it is possible to provide positive interlocking structures between the running jacket and the damper ring and/or between the damper ring and the roller body, by means of which relative movement between the respective two roller parts are prevented. As a result, it becomes possible, that the damper ring and the running jacket in the roller are free of tension.

BRIEF DESCRIPTION OF THE DRAWINGS

Preferred embodiments of the conveyor system in accordance with the invention are described in detail in conjunction with the following Figures. These illustrate.

DETAILED DESCRIPTION OF THE INVENTION

Figure 1:
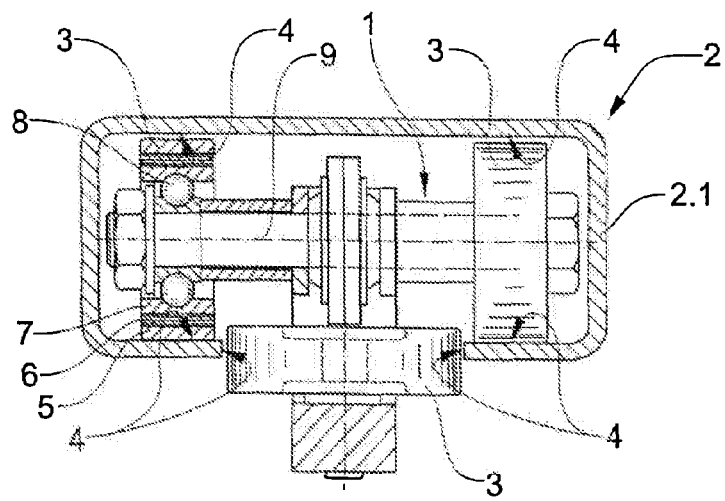
FIGS. 1 and 2 an exemplary embodiment of the conveyor system according to the invention in section transverse to the conveying direction (FIG. 1) and as a side view (FIG. 2)
Figure 2:
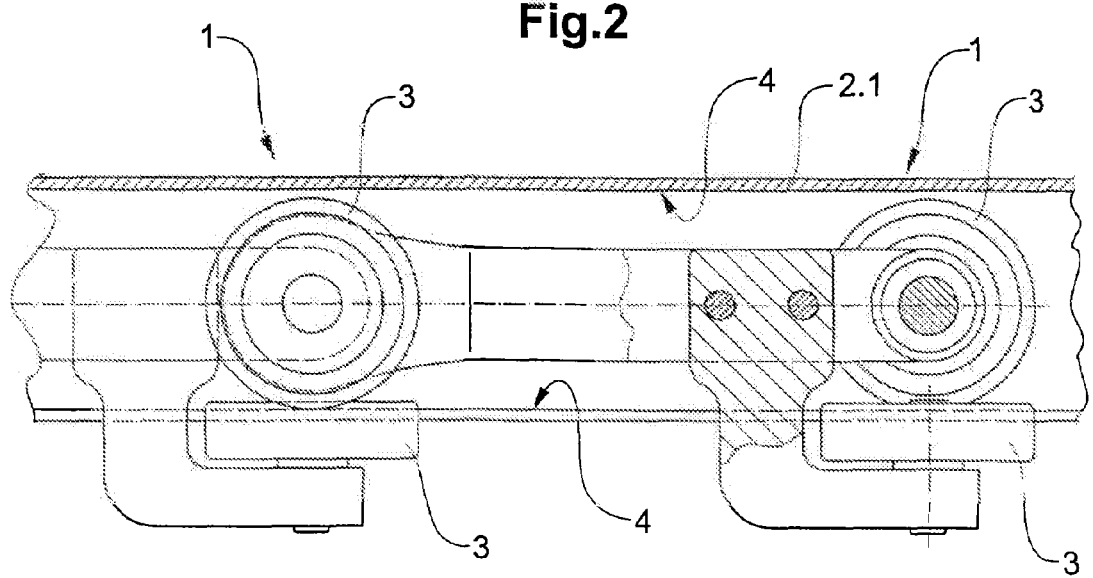

FIGS. 1 and 2 show, in section transverse to the conveying direction (FIG. 1) and as a side view (FIG. 2), an exemplary embodiment of the conveyor system according to the invention or rather the conveyor elements designed as chain links 1 and the guide-way 2 designed as a guide channel 2.1 or this system. The conveyor elements 1, as illustrated, are equipped with three rollers 3 each and the guide channel 2 provides two guide rails 4 for each roller 3. A gripper (not shown) may, for example, be installed on the part of the conveyor element 1 which protrudes from the guide channel.

The rollers 3, as illustrated, comprise a running jacket 5, a damper ring 6 and a roller body 7 with a ball bearing 8 and they are freely rotatable around an axis 9. The guide channel 2.1 is, for example, manufactured of metal or of a hard plastic material, and at those conveying track points at which no load changes occur, the guide rails 4 are simply designed as correspondingly flat surface areas of the channel profile and comprise no further equipment, as is illustrated in FIGS. 1 and 2. The guide rails 4 may furthermore, for example, comprise hardened surfaces or a corresponding surface coating or they may comprise separate rails installed in the guide channel 2.1. At least at those conveying track points, at which load changes may possibly occur, such separate guide rails 4 are provided, wherein between the guide rail and the guide channel 2.1, relatively soft dampening substrates are provided for shock absorption, as will be explained in more detail in conjunction with FIG. 6. It goes without saying, that conveying track points, at which no load changes occur, can, if so desired, be equipped in the same manner.

Both the running surfaces of the guide rails 4 and the running surfaces of the rollers 3 are advantageously flat in a direction transverse to the conveying direction, at least in a central area, which constitutes a relevant part of the running surface width.

Conveyor systems, as illustrated in the FIGS. 1 and 2, have, for example, conveyor elements of around 10 cm length, i.e. 30 rollers per meter of chain length. At usual speeds of several meters per second, these rollers rotate more than 1000 rpm and the rotation direction may change every few seconds, wherein it is possible that in the direction of conveyance, and transverse to it, frictional forces of several 100 N per roller occur. From these figures it is possible to estimate how much conveyor power can be saved, if the running surfaces of the rollers and of the guide rails can be equipped for minimum friction. The material pairing between the running surfaces of the guide rails and rollers designed for minimum friction, however, leads to wear as a result of hard shocks and to noise, which however can be significantly reduced by the simultaneously applied dampening measures.

Figure 3:
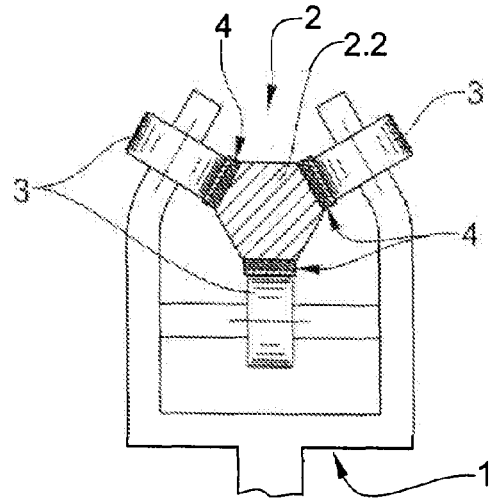
FIG. 3 a further exemplary embodiment of the conveyor system according to the invention (in section transverse to the conveying direction)

FIG. 3 is a section transverse to the conveying direction through a further example of a conveyor system being equipped in accordance with the invention. The guide-way 2 of this conveyor system is designed as a guide girder 2.2 and on different sides it comprises guide rails 4, which are assigned to rollers 3 which have non-parallel axes. The conveyor element 1 on which the rollers 3 are mounted, encompasses the guide-way 2. For the embodiment according to FIG. 3, the problem of the change of the rotation direction of the rollers 3 during load changes is not applicable. Remaining, however, is the problem of the shocks between guide-way 2 and conveyor elements 1 due to load changes as well as the problem of sliding transverse to the direction of conveyance due to load changes and changes of conveying direction, which problems can be solved in the same manner as in the case of the system depicted in FIGS. 1 and 2. This means that the guide rails 4 of the system according to FIG. 3, at least at points of the conveying track at which load changes occur, are supported on dampening substrates 10.

Figure 4:
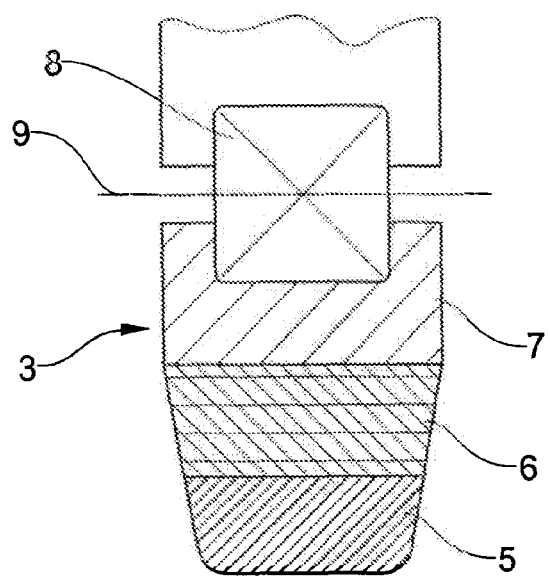
FIGS. 4 and 5 a roller being equipped according to the invention and being depicted in a larger scale, in section parallel to the axis (FIG. 3) and in section transverse to the axis (FIG. 4)
Figure 5:
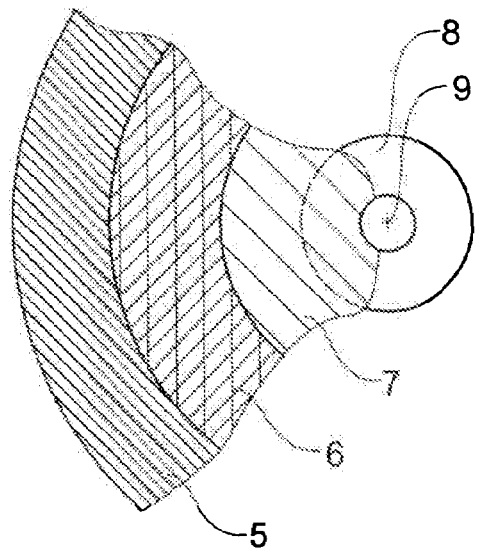

FIGS. 4 and 5 illustrate a further roller 3 equipped according to the invention at a somewhat larger scale than FIGS. 1 and 2. The roller once again comprises a running jacket 5, a damper ring 6 and a roller body 7 with a ball bearing 8. Instead of the ball bearing 8, however, it is also possible to provide another suitable bearing. It is furthermore possible to mount the roller body 7 fixedly on a shaft and to support the shaft in a suitable manner at another point. It is even possible to manufacture the shaft and the roller body as a single piece.

The running jacket 5 advantageously consists of a plastic material with a module of elasticity of over 3000 MPa (tensile load), in preference of a corresponding polyamide, e.g., Tecaglide (commercial name). Because the running jacket 5 comprises a flat running surface, it is possible to manufacture it in a simple manner out of a tube-shaped work-piece, for example, by turning off on a lathe, so that it is not necessary that the material is capable of being injection-moulded, and therefore may be a duroplast or a molded polyamide.

The damper ring, for example, consists of an injection-moldable elastomer with a hardness of between 50 and 80 (Shore A), for example of Santoprene (commercial name, Advanced Elastomer Systems), which is available, e.g., with a hardness of 55 or 73.

The roller body may consist of a metallic material or of a reinforced plastic material with a similar strength, for example, of Grivory (commercial name, EMS Chemie) or Orgalloy (commercial name, Atofina FR), which have a module of elasticity in the range of 7,000 to 10,000 MPa.

For a roller with a diameter of approx. 40 mm, the running jacket 5, for example, is around 2 to 4 mm thick. In the case of the materials pairing of running jacket and damper ring mentioned above, for the damper ring 6 an approximately similar thickness is sufficient, i.e. also 3 to 4 mm.

It becomes manifest, that when using the mentioned rollers not only operational noise and wear are significantly reduced compared with known rollers, but also the energy necessary for the operation becomes significantly less thanks to the relevant reduction of the friction. Furthermore, the rollers remain absolutely round, even when standstills in a loaded condition occur relatively frequently.

Because the roller 3 is manufactured by molding the damper ring 6 between the running jacket 5 and the roller body 7, it is possible to prevent relative rotation between the running jacket 5 and the damper ring 6 and between the damper ring 6 and the roller body 7 without the necessity of tensioning the running jacket 5 or the damper ring 6. Relative rotation can be prevented either by means of a corresponding materials pairing, which causes a material interlocking, or by means of positive locking structures, e.g., axially extending grooves and ridges, such as are illustrated in FIG. 5. Also, positive locking structures extending around the circumference of the rings (e.g., grooves and ridges, such as are illustrated in FIG. 4) are capable of being implemented in a simple manner. These contribute to the stability of the roller in case of lateral loads.

Figure 6:
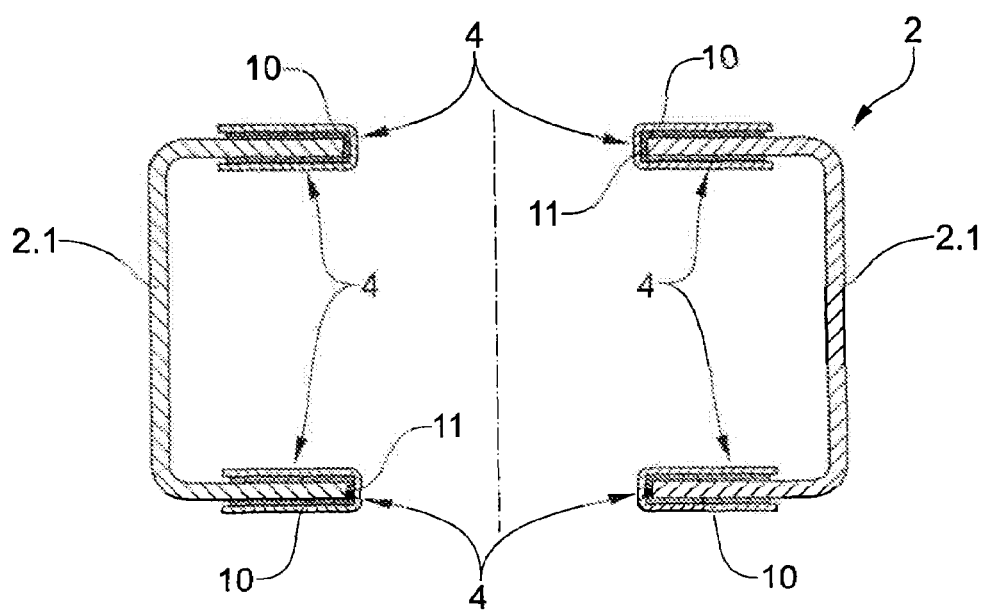
FIG. 6 a cross section through an exemplary guide channel equipped according to the invention.

FIG. 6 is a cross section through a guide-way 2 for a conveyor system according to the invention. The guide-way is designed as a guide channel 2.1 and has a similar shape as the guide channel of FIG. 1. The guide rails 4 of this guide channel 2.1 are equipped according to the invention, i.e., they are supported on a dampening substrate 10. The guide rails 4 consist of a metal or of a relatively hard plastic material, the relevant characteristics of which are approximately the same as the characteristics of the running jacket material described above. The dampening substrates 10 consist of a softer plastic material with characteristics as are described above for the material of the damper ring 6 of the rollers 3. With respect to manufacturing technology, the equipping of the guide rails 4 according to the invention is particularly advantageous for those guide rails which are arranged at the edge 11 of the channel and which usually are designed as a U-shaped profile, which is pushed over this edge 11. The dampening substrate 10 to be arranged between the guide rail 4 and the channel edge 11 is preferably also designed as a U-shaped profile and is dimensioned in such a manner, that it is compressed on assembly and that the resulting strain on the guide rail 4 is sufficient to keep it in position frictionally locked.

As is apparent from FIG. 6, it is possible that the U-shaped guide rail profiles have wider legs, which then on the inside of the channel are able to be utilised as further guide rails supported on the dampening substrate.

A conveyor system, in accordance with the invention, comprises rollers with a relatively hard running jacket, the cross section of which is not significantly deformed during operation. This running jacket is combined with a damper ring on the roller and with a dampening substrate underneath the guide rails, at least at those points of the conveyor track at which load changes occur. It is not a condition for the system according to the invention, that all rollers and all guide rails are equipped in the mentioned manner.

The invention claimed is:

1. A conveyor system defining a three-dimensional conveying track with bends, gradients and twists and therethrough conveying track points, at which load changes occur, the conveying system comprising:

a guide channel comprising a plurality of metal or reinforced plastic guide rails (4) with second running surfaces, the guide channel defining a conveying track, and a plurality of conveyor elements (1) being connected to each other to form a conveyor chain being movable within the guide channel by being pushed and pulled, each conveyor element comprising a plurality of freely rotating rollers being adapted to roll along the guide rails (4) and comprising first running surfaces, which are flat in a direction transverse to the orientation of the conveying track, wherein for the coupling-in of load forces acting in different directions, a pair of opposite guide rails (4) is assigned to each one of the plurality of rollers (3) and at least part of the rollers of each conveyor element have non-parallel axes, wherein the rollers (3) comprise a ball bearing with an outer ring of metal, a plastic or polymer running jacket forming the first running surface and a dampening ring being arranged between the outer ring and the running jacket, an axial extension of the outer ring, the dampening ring, the running jacket and the flat first running surface being the same, wherein the guide rails (4), at least at points of the conveying track, at which load changes occur, are supported on a dampening substrate (10), wherein the dampening ring (6) and the dampening substrate (10) consist of a material which has a smaller module of elasticity than the material of the running jacket (5) and of the guide rails (4), and wherein the dampening ring consists of an elastomer and is connected to the outer ring solely by a material fit connection produced by molding the dampening ring onto the outer ring.

2. The conveyor system according to claim 1, wherein the running jacket (5) of the rollers (3) and the guide rails (4) of the guide-way (2) consist of a material with a module of elasticity of more than 3000 MPa.

3. The conveyor system according to claim 1, wherein the damper ring (6) and the running jacket (5) are free of tension.

4. The conveyor system according to claim 3, wherein the damper ring (6) is secured against rotation relative to the running jacket (5) by a material interlock or by a positive interlock.

5. The conveyor system according to claim 1, wherein the material of the damper ring (6) and of the dampening substrate (11) has a Shore hardness A within the range of 35 to 98.

6. The conveyor system according to claim 5, wherein the material of the dampening substrate (11) is an elastomer.

7. The conveyor system according to claim 1, wherein the material of the running jacket (5) is a polyamide.

8. The conveyor system according to claim 1, wherein the guide-way (2) is designed as a guide channel (2.1) and at least a part of the guide rails is designed as a U-shaped profile pushed over one edge (11) of the channel profile, wherein between the U-shaped profile of the guide rails (4) and the edge (11) the dampening substrate (10), being shaped as a further U-shaped profile, is arranged.

* * * * *